United States Patent [19]

Montijn et al.

[11] 3,910,985

[45] Oct. 7, 1975

[54] PROCESS FOR PREPARING FLUOROANILINES

[75] Inventors: Paulus P. Montijn; Albertus J. Mulder, both of Amsterdam, Netherlands

[73] Assignee: Shell Oil Company, Houston, Tex.

[22] Filed: July 15, 1974

[21] Appl. No.: 488,643

[30] Foreign Application Priority Data
Aug. 2, 1973 United Kingdom............ 36733/73

[52] U.S. Cl...... 260/471 R; 260/518 R; 260/518 A; 260/574; 260/580; 260/590
[51] Int. Cl.²....................................... C07C 101/54
[58] Field of Search.... 260/471 R, 590, 580, 518 A, 260/518 R, 519, 574

[56] References Cited
OTHER PUBLICATIONS

Finak, I. L., Organic Chemistry, (1963), Vol. I, pub. by Richard Clay & Co., Great Britain, p. 546 cited.

*Primary Examiner*—Anton H. Sutto
*Assistant Examiner*—L. A. Thaxton

[57] ABSTRACT

Nitrobenzenes are converted to the corresponding 4-nitroanilines by treatment with hydrogen and hydrogen fluoride in the presence of one or more of certain hydrogenation catalysts, liquid hydrogen fluoride and one or more of certain fluorine-containing acids.

7 Claims, No Drawings

PROCESS FOR PREPARING FLUOROANILINES

BACKGROUND TO THE INVENTION

U.S. Pat. No. 2,884,458 teaches the use of 4-fluoroaniline to prepare 4-fluorophenol, a starting material for the preparation of the fungicide 2,2'-dihydroxy-5,5'-difluoro biphenyl sulfide.

4-fluoroanilines can be reacted with alkyl 2-chloropropionates in the presence of a hydrogen chloride acceptor to give alkyl N-(4-fluorophenyl)-2-aminopropionates, which in turn can be reacted with benzoyl chloride to form alkyl N-(4-fluorophenyl)-N-benzoyl-2-aminopropionates, which are selective herbicides disclosed and claimed in U.S. Pat. No. 3,761,508.

There is thus a need for an efficient process for preparing 4-fluoroanilines.

DESCRIPTION OF THE INVENTION

It has been found that 4-fluoroanilines can be prepared efficiently by treating a nitrobenzene of the formula:

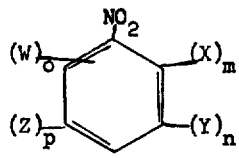

with hydrogen and hydrogen fluoride in the presence of one or more of certain hydrogenation catalysts, liquid hydrogen fluoride and one or more of certain fluorine-containing acids. In the formula, $m$, $n$, $o$, and $p$ each is zero or one and W, X, Y, and Z each is halogen (fluorine, chlorine, bromine, iodine), alkyl, alkyloxo, alkoxyoxo, carboxyl, —NHalkyl, —N(alkyl)$_2$ or —NH$_2$, wherein each alkyl is of straight-chain or branched-chain configuration and contains from 1 to 6 carbon atoms.

Because of the utility of the products which can be prepared therefrom, the halogen-substituted, particularly chlorine-substituted nitrobenzenes are of particular interest.

Examples of nitrobenzenes suitable for use as starting materials and of the 4-fluoroanilines produced by the process of this invention are:

| Starting nitrobenzene | 4-fluoroaniline product |
|---|---|
| Nitrobenzene | 4-Fluoroaniline |
| 2-Chloronitrobenzene | 2-Chloro-4-fluoroaniline |
| 3-Chloronitrobenzene | 3-Chloro-4-fluoroaniline |
| 2,3-Dichloronitrobenzene | 2,3-Dichloro-4-fluoroaniline |
| 2,6-Dichloronitrobenzene | 2,6-Dichloro-4-fluoroaniline |
| 2,5-Dichloronitrobenzene | 2,5-dichloro-4-fluoroaniline |
| 3,5-Dichloronitrobenzene | 3,5-Dichloro-4-fluoroaniline |
| 3,6-Dichloronitrobenzene | 3,6-Dichloro-4-fluoroaniline |

In each of these eight examples the chlorine atom(s) may be replaced by any of the other named substituents, for the production of the corresponding 4-fluoroanilines. Excellent results are obtained with nitrobenzene, the selectivity to p-fluoroaniline being about 95%. Very good results are obtained with 3-chloronitrobenzene, which can be fully converted, with selectivity to 3-chloro-4-fluoroaniline of about 60 to 70 %. A usual by-product is the aniline (fluorine-free) corresponding to the original nitrobenzene starting material.

Suitable hydrogenation catalysts which may be used in the process of the invention are the noble metals of Group VIII of the Periodic Table of the Elements, viz., ruthenium, rhodium, palladium, osmium, iridium and platinum, and the oxides of each of these elements. The catalysts may be employed as such or on a carrier, for example on carbon, aluminum fluoride, calcium fluoride, barium sulphate, calcium sulphate and zirconium dioxide. Excellent results are obtained with platinum dioxide, which therefore is preferred.

The suitable fluorine-containing acids include: tetrafluoroboric acid (HBF$_4$), hexafluorophosphoric acid (HPF$_6$) hexafluoroarsenic acid (HAsF$_6$), hexafluoroantimonic acid (HSbF$_6$), hexafluorotantalic acid (HTaF$_6$), hexafluoroniobic acid (HNbF$_6$), hexafluorotitanic acid (H$_2$TiF$_6$), hexafluorostannic acid (H$_2$SnF$_6$) and hexafluorosilicic acid. The acid per se can be used, or it can be prepared in situ by using the corresponding acidic fluoride and sufficient liquid hydrogen fluoride to form the required acid. Referring to the acids above, the suitable acidic chlorides would be boron trifluoride, phosphorus pentafluoride, arsenic pentafluoride, antimony pentafluoride, tantalum pentafluoride, niobium pentafluoride, titanium tetrafluoride, stannic tetrafluoride and silicium tetrafluoride, respectively.

Excellent results are obtained using tetrafluoroboric acid (boron trifluoride + liquid hydrogen fluoride), which therefore is preferred.

To ensure a liquid hydrogen fluoride phase the process according to the invention should be performed below 230°C, the critical temperature of hydrogen fluoride. Preferred temperatures are in the range of from 25°and 75°C, although temperatures below 25°C are not precluded.

Other variables involved in the process of the invention are not known to be critical. In general, the following parameters apply:

a. The molar ratio of the fluorine-containing acid/nitrobenzene reactant: about 0.5 to about 5.0;

b. The hydrogen fluoride/nitrobenzene reactant molar ratio: stoichiometrically is 1; preferably is about 10 to about 100;

c. The catalyst/nitrobenzene reactant molar ratio: about 0.0001 to about 0.05;

d. Hydrogen pressure: about 0.1 to about 10 bars, absolute;

e. Reaction time: about 1 to about 15 hours;

f. The amount of liquid hydrogen fluoride: sufficient to provide a mobile fluid reaction mixture.

Water formed during performance of the process of the invention may be removed by incorporating into the reaction mixture an agent capable of removing water. Examples of such water-removing agents, which must be resistant to hydrogen fluoride, are aluminium fluoride and kryolite (Na$_3$AlF$_6$).

The 4-fluoroaniline product can be recovered and isolated by any convenient conventional technique. For example, one convenient procedure is as follows: hydrogen fluoride is flashed off, together with boron trifluoride, if present. Water is added to the residue thus obtained, the catalyst is removed from the resulting suspension by filtration, the aqueous layer is rendered alkaline and the liberated aniline is separated by means of steam distillation with simultaneous introduction of

TABLE

| Exp. No. | Starting materials, moles | | | Pressure, bar | | Temp., °C | Time, hr. | Conversion % | Selectivity, %w, to 4-fluoroaniline |
|---|---|---|---|---|---|---|---|---|---|
| | nitrobenzene | BF₃ | PtO₂ | autogenous | H₂ | | | | |
| 1 | 0.21 | 0 | 0.0011 | 2 | 1.5–2 | 50–53 | 6 | 100 | 88 |
| 2 | 0.21 3-chloro-nitrobenzene | 0.37 | 0.0011 | 5.6 | 0.6 | 42 | 12.5 | 100 | 95 3-chloro-4-fluoro-aniline |
| 3 | 0.21 | 0 | 0.0011 | 2 | 1 | 40–44 | 5 | 100 | 10 |
| 4 | 0.21 | 0.3 | 0.0011 | 3.5 | 0.7 | 43–49 | 2.5 | 100 | 60 |
| 5 | 0.21 | 0.25 | 0.0011 | 2.2 | 0.7 | 42 | 6 | 100 | 65 |
| 6 | 0.21 | 0.25 | 0.0022 | 3.6 | 0.6 | 42 | 2 | 100 | 62 |
| 7 | 0.21 | 0.55 | 0.0011 | 4.4 | 0.6 | 42 | 2.5 | 100 | 70 | carbon dioxide to prevent oxidation of the aniline. The steam distillate is extracted with a water-immiscible solvent, the extract is dried and the solvent is evaporated, leaving as a residue a mixture comprising the 4-fluoroaniline and the by-product aniline corresponding to the starting nitrobenzene. This mixture is separated in any convenient manner, for example by crystallization.

The invention is illustrated by the following experiments:

Seven experiments were performed in a 500-ml "Hastelloy C" autoclave provided with a paddle mixer. The autoclave was charged with 8 moles of hydrogen fluoride and the quantities of starting materials indicated in the table, second, third and fourth columns from the left. The analysis of the liquid hydrogen fluoride is as follows (%w): HF 99.95; $H_2SiF_6$, 0.003; $SO_2$, 0.0004; $H_2O$, 0.007; $H_2SO_4$ plus $HSO_3F$, 0.0002; Cl, 0.0004 and As, 0.0001. The platinum dioxide catalyst was prepared as described in A.I. Vogel's "A Text-Book of Practical Organic Chemistry," Longmans, Green and Co. Ltd. (1956) 3rd., pp 470–471, Method 2. The autogeneous pressure stated in the table, fifth column from the left, was the pressure at the reaction temperature just before the hydrogen was introduced into the autoclave. Hydrogen was admitted until the pressure had increased by the value stated in the sixth column from the left. The total pressure, being the sum of the autogeneous and hydrogen pressures, was maintained throughout the reaction time by adding hydrogen. The autoclave was kept at the reaction temperatures indicated in the fifth column from the right. After the reaction times stated in the fourth column from the right had elapsed, the autoclave was depressurized and the hydrogen fluoride in experiments 2, 4, 5, 6 and 7 together with boron trifluoride was removed by stripping with nitrogen at a temperature of 30°C. The residue thus formed was solid and was mixed with ice-water. The catalyst was filtered off from the mixture obtained and the filtrate rendered alkaline with an aqueous solution of potassium carbonate to a pH of 10. The neutralized filtrate was subjected to steam distillation with simultaneous introduction of carbon dioxide. The distillate was extracted with diethyl ether, the extract dried over anhydrous sodium sulphate at ambient temperature and the ether evaporated from the dried extract, leaving a residue consisting of the p-fluoroaniline and the by-product aniline. The composition of this residue was determined by means of gas-liquid chromatography. The conversions and selectivities to the p-fluoroanilines are presented in the second and first columns from the right.

We claim as our invention:

1. A process for preparing 4-fluoroanilines, which comprises treating at a temperature above about 25°C a nitrobenzene of the formula

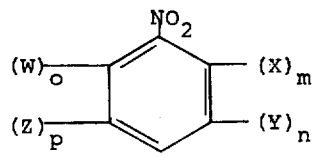

wherein $m$, $n$, $o$ and $p$ each is zero or one, and W, X, Y and Z each is halogen, alkyl, alkyloxo, alkyloxyoxo, carboxyl, —NH alkyl, —N(alkyl)₂ or —NH₂, each alkyl containing from 1 to 6 carbon atoms, with hydrogen and hydrogen fluoride in the presence of
   a. at least one hydrogenation catalyst selected from the noble metals of group VIII of the Periodic Table of the Elements, and their oxides,
   b. liquid hydrogen fluoride, and
   c. at least one fluorine-containing acid selected from tetrafluoroboric acid, hexafluorophosphoric acid, hexafluoroarsenic acid, hexafluoroantimoic acid, hexafluorotitanic acid, hexafluorostannic acid, hexafluorotantalic acid, hexafluoroniobic acid and hexafluorosilicic acid, the molar ratio of hydrogen fluoride to nitrobenzene reactant being at least 1.0, the hydrogen pressure being from about 0.1 to about 10 bars, absolute, and the amount of liquid hydrogen fluoride being sufficient to provide a mobile fluid reaction mixture.

2. A process according to claim 1 wherein W, X, Y and Z each is halogen.

3. A process according to claim 2 wherein W, X, Y and Z each is chlorine.

4. A process according to claim 3 wherein the hydrogenation catalyst is platinum dioxide and the fluorine-containing acid is tetrafluoroboric acid.

5. A process according to claim 4 wherein $m$, $o$ and $p$ is zero, $n$ is one and Y is chlorine.

6. A process according to claim 1 wherein the fluorine-containing acid is formed in situ by reaction of the appropriate acidic fluoride and liquid hydrogen fluoride.

7. A process according to claim 5 wherein the tetrafluoroboric acid is formed in situ by reaction of boron trifluoride and liquid hydrogen fluoride.

\* \* \* \* \*